United States Patent [19]

Covington

[11] Patent Number: 5,798,619
[45] Date of Patent: Aug. 25, 1998

[54] TECHNIQUES FOR CONTROLLING REMOTE LAMP LOADS

[75] Inventor: John H. Covington, Dallas, Tex.

[73] Assignee: Vari-Lite, Inc., Dallas, Tex.

[21] Appl. No.: 666,106

[22] Filed: Jun. 19, 1996

Related U.S. Application Data

[63] Continuation of Ser. No. 389,113, Feb. 15, 1995, abandoned.

[51] Int. Cl.$^6$ .................................................. H02B 37/02
[52] U.S. Cl. ...................... 315/307; 32/283; 315/224; 315/DIG. 7; 315/DIG. 4; 315/200 R
[58] Field of Search ........................... 323/288, 283, 323/17; 315/194, 224, DIG. 7, DIG. 4, 200 R, 291, 307; 307/10.8

[56] References Cited

U.S. PATENT DOCUMENTS

| | | | |
|---|---|---|---|
| 2,965,804 | 12/1960 | Roesel, Jr. et al. | 315/224 |
| 3,609,515 | 9/1971 | Babcock | 315/194 |
| 3,665,442 | 5/1972 | Brooks | 315/200 R |
| 3,890,537 | 6/1975 | Park et al. | 315/247 |
| 3,943,397 | 3/1976 | Yancey | 315/317 |
| 4,101,808 | 7/1978 | Flint | 315/151 |
| 4,119,907 | 10/1978 | Quinn | 315/105 |
| 4,160,945 | 7/1979 | Schorr | 323/17 |
| 4,187,528 | 2/1980 | Morriss | 361/399 |
| 4,277,728 | 7/1981 | Steven | 315/247 |
| 4,442,138 | 4/1984 | Komrumpf | 363/21 |
| 4,455,526 | 6/1984 | Miller | 323/282 |
| 4,506,318 | 3/1985 | Nilssen | 363/152 |
| 4,585,986 | 4/1986 | Dyer | 323/271 |
| 4,712,169 | 12/1987 | Albach | 363/89 |
| 4,719,552 | 1/1988 | Albach et al. | 363/44 |
| 4,772,825 | 9/1988 | Tabor et al. | 315/312 |
| 4,772,999 | 9/1988 | Fiorina et al. | 363/141 |
| 4,902,958 | 2/1990 | Cook, II | 323/282 |
| 4,916,380 | 4/1990 | Burroughs | 323/282 |
| 4,929,884 | 5/1990 | Bird et al. | 323/313 |
| 5,051,667 | 9/1991 | Dunham | 315/307 |
| 5,175,477 | 12/1992 | Grissom | 315/291 |
| 5,225,767 | 7/1993 | Gulczynski | 323/282 |
| 5,268,631 | 12/1993 | Gorman et al. | 323/246 |
| 5,293,077 | 3/1994 | Seki et al. | 307/10.8 |
| 5,491,387 | 2/1996 | Saito | 315/247 |

FOREIGN PATENT DOCUMENTS

| | | |
|---|---|---|
| 0239653 A1 | 3/1986 | European Pat. Off. . |
| 0274292A1 | 11/1987 | European Pat. Off. . |
| 0382357A1 | 1/1990 | European Pat. Off. . |
| 0390328A1 | 2/1990 | European Pat. Off. . |
| 0375289 A2 | 6/1990 | European Pat. Off. . |
| 0375289 A3 | 8/1991 | European Pat. Off. . |

OTHER PUBLICATIONS

LPS–045/200–H Halogen Lamp Power Supplies, Oct. 15, 1993, Rev. 2, Part No. SX00774–000 (Owners's Manual).

Primary Examiner—Robert J. Pascal
Assistant Examiner—Michael Shingleton
Attorney, Agent, or Firm—Morgan & Finnegan, L.L.P.

[57] ABSTRACT

For energizing remote lamp loads subjected to indeterminate transmission losses, a current regulating power supply is described which delivers a regulated current to the load using for example, a full wave rectifier supplying an unfiltered pulsating voltage to a switching regulator controlled by a feedback loop incorporating a current sensing resistor and pulse width modulator. The supply has a substantially unity power factor, a self-quenching characteristic in the presence of circuit interruptions, and can deliver regulated current to a variety of lamp types.

15 Claims, 2 Drawing Sheets

TECHNIQUES FOR CONTROLLING REMOTE LAMP LOADS

This application is a continuation of Ser. No. 08-389,113 filed on Feb. 15, 1995, now abandoned.

TECHNICAL FIELD OF THE INVENTION

The present invention relates to electrical power supply regulation and, more particularly, to regulated power supplies particularly suited to the control of remote lamp loads.

BACKGROUND OF THE INVENTION

Luminaires are sometimes used in applications where the light intensity is adjustable and is controlled and energized from remote sites. An example is the Vari-Lite Series 300 automated stage lighting system using tungsten halogen VL5 wash luminaires. There are other applications in the entertainment field and in the architectural lighting field as well.

Adequate lamp brightness in these environments is high on the list of important qualities. In stage applications for example, lighting designs are based on assumptions that the luminaires will operate at rated levels for both brightness and color. This objective is sometimes frustrated or at least compromised by ir drop in the lines running from the light regulator, e.g. a dimmer unit, to the luminaire.

Resistance in the cabling and connections can reduce the power applied to the light by a significant amount, as much as 15% in some cases. Further, this resistance is indeterminate, complicating efforts to compensate for it.

Most lamp dimmers for incandescent lamps employ phase angle control of Triac or silicon controlled rectifier (SCR) output stages and are operable to control the start of conduction during the alternating current (AC) input cycle. The duration of the conductive portion of each half-cycle is thereby controlled to control the total power output provided to the lamp, thus controlling the brightness of light emitted by the lamp. While this arrangement has worked well for many years, there are certain problems associated with the phase angle control utilized in dimmer regulators. These dimmers are voltage regulators and while they can ensure a generally constant voltage at the dimmer output terminals, they do not know what voltage the remote lamp actually obtains because they do not know what voltage is dropped in the cabling and connections.

Voltage regulators employing other control techniques, e.g. switching regulators, are similarly handicapped.

While regulators are available with remote sensing features these require the routing of additional sensing leads to the lamp from the controller, a solution that is impractical for many applications.

Thus, there is a need for a controller that can insure the delivery to the lamp of the required voltage and current notwithstanding unpredictable transmission losses.

Other problems plague the typical phase angle control dimmer. These include the generation of radio frequency noise emitted by the power supply and radiated to surrounding equipment from interconnecting cables. The fast turn-on times of the Triac's or SCR's produce this interference and also cause audible noise to be emitted by the lamp due to ringing of the lamp's filament.

These turn-on transients present other formidable problems as well. Phase-angle controlled dimmers are capable of delivering instantaneous peak output voltages one-point-four (1.4) times greater than the nominal (RMS) value of the input AC voltage. Such a dimmer set for 50 percent output turns on when the input voltage waveform is at its peak value, usually about 40 percent greater than the nominal (RMS) value. This can present a significant and possibly destructive mechanical shock to a cold filament, which draws more current at a given voltage than a hot filament. Paradoxically, a phase angle controlled Triac or SCR dimmer set for 50 percent output can cause greater damage to a cold filament than such a dimmer set for 100 percent output, since at full output the dimmer's output devices turn on when the instantaneous AC input voltage is close to zero. As a consequence of their mode of operation phase angle controlled dimmer thus require additional measures to deal with transient current surges.

Another problem common to phase angle controlled dimmers is that the dimmer circuit and the lamp are designed to work with one AC source. When the control input to the dimmer is set to its maximum, about 95 percent of the full input line voltage is typically provided at the output terminals of the dimmer circuit. This requirement presents a problem for touring entertainment shows that carry their equipment to different countries on different continents where the line voltage may be 240 volts in one country and 120 volts in another. In the former case, a 120 volt lamp will be exposed to almost 240 volts when the dimmer control, e.g. a fader, is set to maximum. A 240 volt lamp will receive a maximum of 120 volts in the second case, clearly an inadequate level.

Lighting systems commonly represent heavy electrical loads requiring multiphase power. When used in touring equipment they are confronted not only with different line or mains voltage in different countries, but also with different power distribution configurations, e.g. delta and wye.

When connected to the neutral of wye power sources the lighting regulators should preferably have a substantially non-reactive power factor to minimize neutral currents. While phase-angle controlled dimmer designs typically present a substantially unity power factor at full output, they appear more reactive at reduced values, thus aggravating the problem of maintaining a balance in the neutral leg currents.

Other voltage regulators are even less suitable. Many have reactive input impedances which aggravate the neutral current problem. Conditions in stage lighting where the total lamp load may be in the hundreds of kilo-watts involving scores of incandescent lamp supplies, make the problem of unbalanced neutral currents a serious one.

Conventional phase-angle dimmers have other disadvantages. They require synchronization with the line and often need special circuits to avoid sync loss resulting from interference. They can operate over only a narrow frequency range. They are not well suited to low voltage lamps which have a number of features attractive for stage lighting.

Other types of voltage regulators avoid some of these problems but often at the cost of introducing others. Some supplies do not respond well to interruptions such as often occurs in the entertainment environment. Live cables are often disconnected and the resultant arcing is enhanced rather than quenched in some regulator designs.

SUMMARY OF THE INVENTION

It has been discovered that all of the foregoing problems can be significantly mitigated if not eliminated by approaching the remotely controlled lighting problem, not with the traditional voltage regulating approach, but rather from a current regulation perspective. The entertainment industry's mindset is voltage regulation, but as will be demonstrated below a special form of current regulation solves a host of shortcomings that plague present technology.

In its operating range, the incandescent lamps of primary interest here have a reasonably constant resistance and will develop a light intensity level proportional to the lamp current squared. Thus by controlling the current level, the desired intensity is achieved independently of transmission losses.

Accordingly, one aspect of the invention contemplates a lamp power supply circuit comprising a controlled-current source having a control system for modulating the output power level by regulating the output current delivered to a remote lamp over a conductive path of indeterminate resistance.

According to another aspect of the invention, a method is provided for delivering to the remote lamp load, a specified current in such a way that lamp brightness is regulated notwithstanding indeterminate and varying line losses.

Still other aspects of the invention provide in such regulators and methods, a substantially unity power factor with its attendant advantages.

The circuits and methods according to the invention also permit one regulator to serve the needs of a variety of lamps of differing voltage ratings, and permit those lamps to be energized free of destructive transients and over a wide range of input frequencies and voltages. Indeed the circuits and methods can operate from DC sources while still retaining major advantages.

BRIEF DESCRIPTION OF THE DRAWINGS

A more complete understanding of the present invention can be had by reference to the following Detailed Description with the accompanying drawings, wherein.

DETAILED DESCRIPTION

Figure 1:
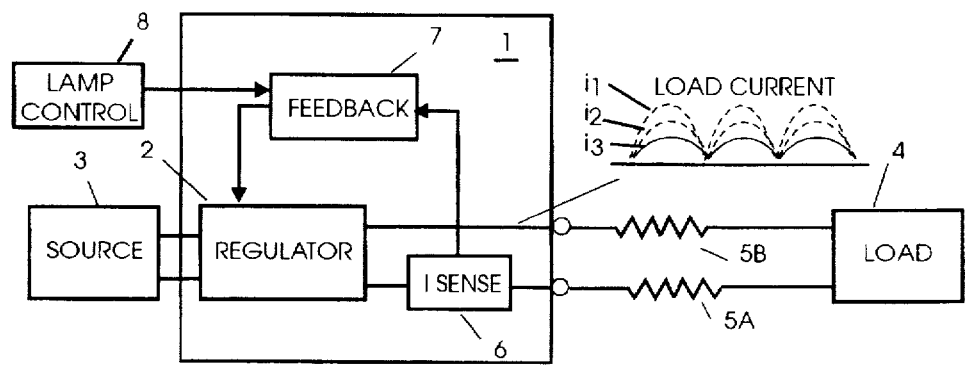
FIG. 1 is a simplified schematic diagram of a lamp power supply circuit according to the present invention.

According to one embodiment of the present invention shown in FIG. 1, a lamp power supply 1 includes a regulator 2 which is energized from a source 3 and delivers pulsating direct current (DC) electrical energy to a lamp load 4 via cables having unknown resistances 5A and 5B. This output is generated in response to an input current-setting signal derived from an intensity control source such as a fader 8. This signal is applied as an input to a feedback circuit 7 which also responds to the actual current supplied to the lamp load via a current sense circuit 6. The latter provides a signal proportional to the load current to the input of the feedback circuit. Any departure in the sensed lamp current is detected by the feedback circuit causing a change in the error signal which controls the regulator 2, producing a corresponding correction in the lamp current as symbolized by the waveform $i_1$, $i_2$ and $i_3$.

In operation, the lamp power supply 1 is calibrated to deliver at full output the proper current level to the lamp load. The lamp is rated to produce a certain brightness at a certain voltage level. While the rating is typically in volts, lamp current is often a better parameter for describing performance. As the output current to the lamp load is regulated at the proper level, the proper voltage is automatically developed across the lamp (the product of its resistance and current) and the correct brightness is obtained regardless of the accumulated resistance of any interconnecting cable assemblies.

As the proper output current level is regulated by the action of the current-sensing feedback signal, the lamp's voltage is determined by the voltage drop developed across the lamp load. It is therefore possible, for example, to operate a lamp load rated for 1000 watts at 120 volts AC, from a lamp power supply according to the present invention that receives 208 volts AC or 220 volts AC without damage to the lamp. As long as the power supply is calibrated to provide the proper output current level at full output, the input voltage to the power supply can be any practical value above a certain minimum value and the proper voltage at the lamp load is maintained by regulating the current supplied to the lamp.

Further, by designing the system to present a substantially unity power factor, the supply 1 can be energized from terminals which include the power panel neutral thereby avoiding aggravation of the unbalanced neutral problem.

Regulator 2 may take a number of well known forms including series switching types and even phase regulation types. The former, however, are preferred for many applications. A DC source can provide the requisite regulation but lacks the self quenching feature.

The feedback loop can also be implemented by a variety of well known techniques, the selection being dependent on desired ratings and on the type of regulator.

Figure 2:
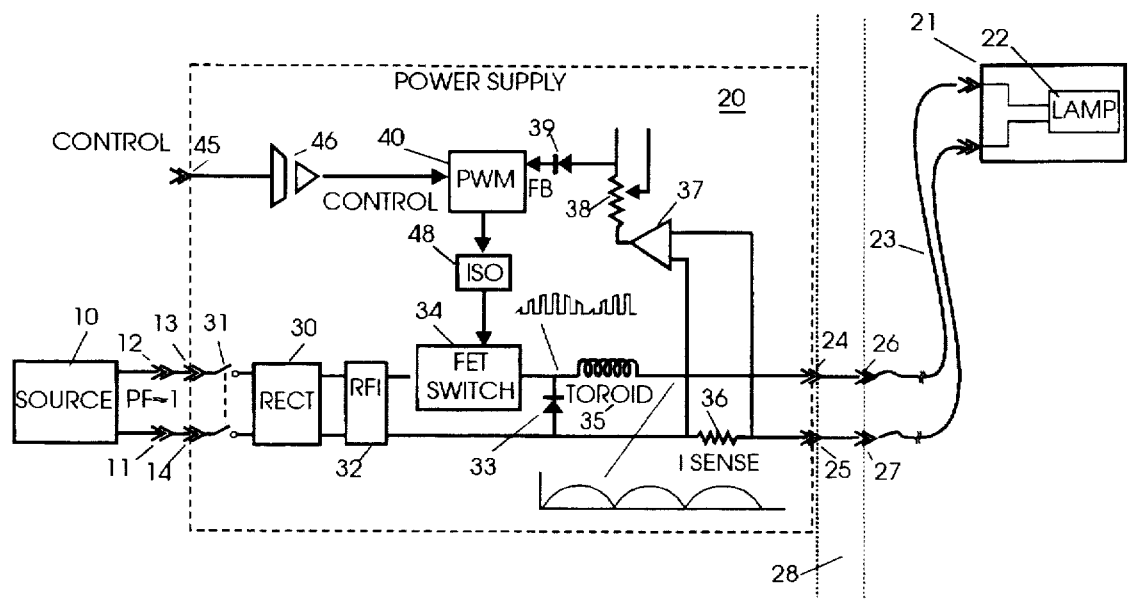
FIG. 2 is a schematic diagram illustrating a preferred embodiment of the present invention.

Referring now to FIG. 2, a preferred embodiment includes a power supply 20 which operates from a source 10 and presents to that source a substantially unity power factor. The supply 20 delivers a regulated current to the luminaire 21 having a lamp 22.

In a typical installation the power supply 20 is plugged into a rack 28 via contacts 24 and 25. There is internal wiring in the rack which terminates at output connectors such as 26 and 27. Connected to those points are cables such as 23 running to the lamp, sometimes directly and sometimes via distribution units. By way of example, the illustrated application has the luminaire 21 connected to the rack 28 via a direct, but in some cases lengthy, conducting cable 23.

At the input end, the supply 20 is connected to source 10 by cabling and connections as exemplified by connections 11–14.

The input to the power supply is coupled to a rectifier 30 via switching means 31 which may also embody a circuit breaker. The rectifier 30 is illustratively of the full wave bridge type and its output is applied to the lamp load via a number of elements which include an RFI section 32 and a controllable FET switch 34, the operation of which will be explained below. The bridge preferably avoids the usual filter capacitors for DC storage. The RFI section does not significantly alter the input impedance which is primarily resistive.

The output of the FET switch 34, a pulsating modulated current, is supplied to the output terminals via a toroid inductor 35 connected to output terminal 24. In one leg of the supply a current sensing resistor 36 is employed, this resistor supplying a sensing signal to an amplifier 37.

Connected across the combination of the toroid, the lamp and the sensing resistor is a diode 33 serving as a recirculating diode which is reverse biased during one part of the duty cycle but permits the circulation of current through the load during the other portion of the cycle.

The sensing resistor 36 delivers a sensing voltage to the feedback amplifier 37. The output of amplifier 37 is presented to a potentiometer 38 adjusted according to lamp type and having one end connected to the pulse width modulator 40 via a diode 39. Thus the sensed current supplies an input to the modulator. Another input is the desired intensity level as reflected in a control signal delivered to the PWM 40 from a control input terminal 45 via an amplifier 46. The control input is compared with the feedback signal; the resultant error signal controls the duty cycle of the pulse width modulator whose output is supplied to the FET switch 34 via an isolating circuit 48. In some cases the latter is not required, e.g. where the pulse width modulator incorporates isolation.

The FET switch operates in the normal manner to switch between the on and off state, to thereby vary the duty cycle in response to the error signal, thus providing closed loop regulation.

Figure 3:
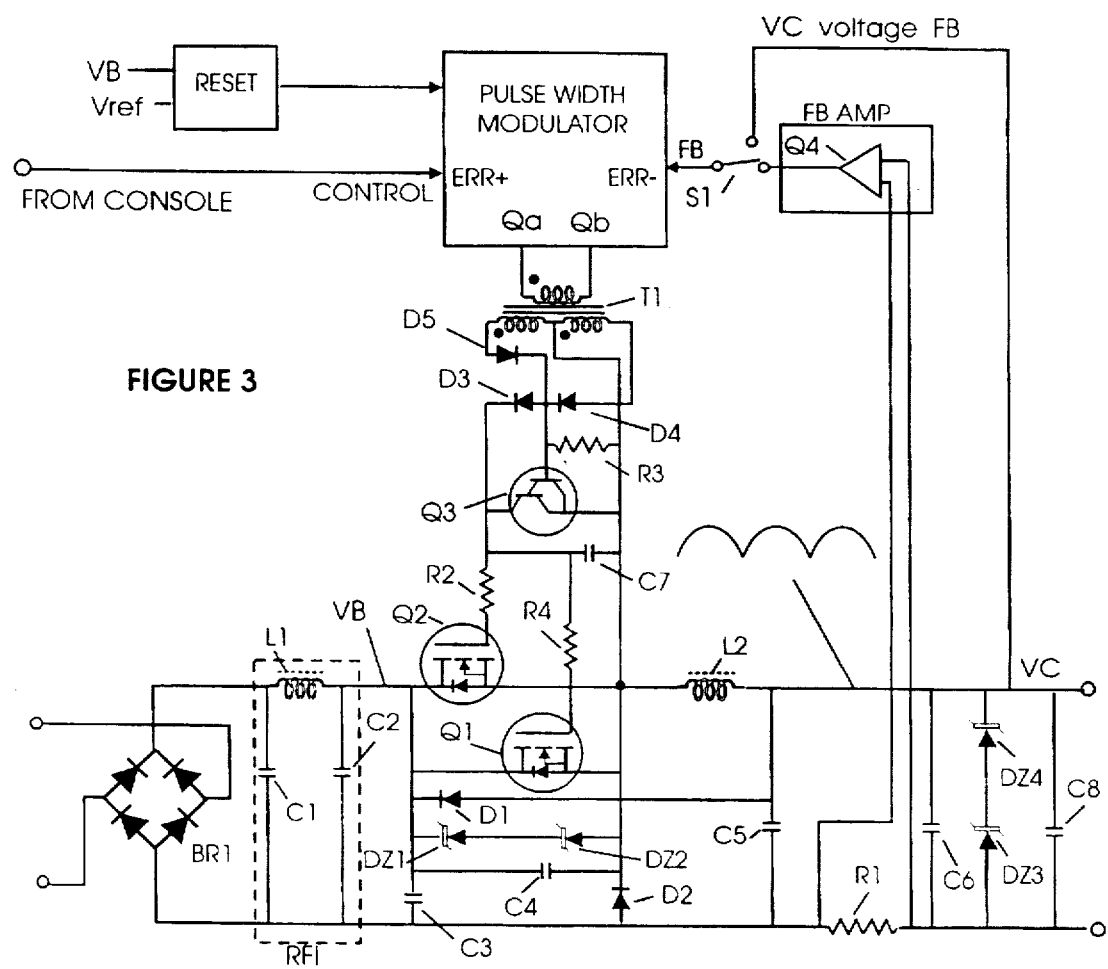
FIG. 3 illustrates additional details of the preferred embodiment.

In the preferred embodiment the FET switch is an SG3526N which operates at a frequency of 50 khz and is galvanically isolated from the PWM 40 by a transformer and Darlington circuit as shown in FIG. 3.

FIG. 3 provides additional switch and related details. The switch 34 is embodied as a pair of paralleled FET switches Q1 and Q2. These switch the power developed from the source via a full wave rectifier bridge, BR1. An RFI filter to isolate the source from switch transients is formed of inductor L1 and capacitors C1 and C2. The switches are shunted with a pair of serially connected zeners, DZ1 and DZ2. Capacitor C4 provides an additional shunt path.

Serially connected to the Switch is toroid L2, corresponding to the toroid 35 of FIG. 2. The diode D2 corresponds to the recirculating diode 33 while R1 serves as the sensing resistor. The pair of serially connected zeners, DZ3 and DZ4 provide surge protection.

The switch is controlled from the Pulse Width Modulator 40 via the previously mentioned isolating circuit which illustratively includes a transformer T1 having a primary energized from the PWM output terminals Qa and Qb, and a pair of secondary windings which deliver the appropriate control signals to the Switch via a darlington circuit Q3.

The bridge output voltage VB is monitored and compared to an appropriate reference voltage Vref in the RESET comparator to produce a modulator reset in the event of a low input voltage condition.

The supply output voltage VC is also made available as an alternate feedback parameter via switch S1 for use in energizing voltage controlled loads.

A table of circuit values is provided below for implementing the exemplary embodiment.

It will be recognized that the foregoing circuit is just one of many control schemes which can be adapted to achieve the features of the invention.

Values in UF and ohms unless otherwise indicated.

| | |
|---|---|
| C1 | 1.0/400 v uFD |
| C2 | 1.0/400 v uFD |
| C3 | 1.0/400 v uFD |
| C4 | .001 uFD |
| C5 | .001 uFD |
| C6 | 2.0/200 v uFD |
| C7 | .001 uFD |
| C8 | .033/1 kv uFD |
| R1 | .025/5 W |
| R2, R4 | 47 |
| R3 | 1 k |
| Q1, Q2 | APT5025 |
| Q3 | TIP117 |
| Q4 | AD620AN |
| L1 | 100 uH |
| L2 | 4.0 mH |
| D1 | MUR1560 |
| D2 | HFA25PB60 |
| D3, D4, D5 | MUR110 |
| PWM40 | SG3526N |

What is claimed is:

1. A power supply for energizing a remote substantially resistive load connected to said supply over a conductive path of indeterminate resistance, said power supply being connectable to a power source supplying a source voltage waveform and an input current waveform at a source frequency to said power supply, said power supply comprising:
   a. a load current sensing circuit; and
   b. a current regulator couplable to the substantially resistive lamp load, said current regulator supplying a regulated current to said lamp load in response to the sensing circuit, said current regulator introducing no phase shift between said source voltage waveform and input current waveform, said current regulator having an unfiltered output with respect to said source frequency, and said current regulator having no substantially reactive components at said source frequency wherein said input current waveform is substantially in-phase with and proportional to said source voltage waveform.

2. A power supply as defined in claim 1 in which said current regulator presents a substantially unity power factor to said source.

3. A power supply as defined in claim 1 or claim 2 in which said current regulator comprises a switching circuit controlled by a closed loop feedback system which is connected to said sensing circuit.

4. A power supply as defined in claim 1 or claim 2 in which said current regulator includes a full wave rectifier.

5. A power supply as defined in claim 1 or claim 2 in which said current regulator delivers a pulsating current to said load and regulates the amplitude of said pulsating current to regulate load current.

6. A power supply as defined in claim 1 or claim 2 in which said current regulator comprises a full wave rectifier and a series switch.

7. A power supply as defined in claim 1 or claim 2 in which said current regulator comprises a pulse width modulated switching circuit connected in series with said load.

8. A method of energizing a remote substantially resistive load over a conductive path of indeterminate resistance from a power source providing a source voltage waveform and an input current waveform at a source frequency, comprising the steps of:
   a. processing a current for delivery to the load;
   b. sensing the value of the load current; and
   c. regulating the load current to be constant in response to the sensing step and during said regulating step introducing no phase shift between a source voltage waveform and an input current waveform, producing an unfiltered current regulator output with respect to said source frequency, and having no substantially reactive components at said source frequency wherein said input current waveform is substantially in-phase with and proportional to said source voltage waveform.

9. A power supply comprising:
   a. a load current sensing circuit; and b. a current regulator coupled to an alternating current power source and coupled to a substantially resistive lamp load, said current regulator having no source voltage sensing circuits and including means for supplying a regulated current to said lamp load in response to the sensing circuit, said current regulator including means for having no substantially reactive components at a power source frequency and introducing no phase shift between a source voltage waveform and a source current waveform wherein an input current waveform is substantially in-phase with and proportional to said source voltage waveform.

10. The method of claim 8 in which the load current is regulated to provide a substantially unity power factor.

11. The method of claim 8 in which the load current is regulated by a negative feedback controlled switching action responsive to said sensing step.

12. The method of claim 8 in which the load current is regulated by a full wave rectifier.

13. A variable power supply for entertainment lighting applications comprising:

a. input terminals adapted for connection to an AC power source;

b. a full-wave rectifier connected to said input terminals, said rectifier providing pulsating DC power to an output thereof;

c. a semi-conductor switching element having a power input, a power output and a control input, said power input being connected to said rectifier output;

d. a series inductor having an input and an output, said inductor input being connected to said switching element power output;

e. a recirculating diode connected between the said rectifier output and said inductor input;

f. a control system comprising a pulse width modulator having a control input, a feedback input and a modulator output g. an isolation circuit coupled to the pulse width modulator output and the switching element control input; and h. a resistive current sensing element coupled to an amplifier providing an output indicative of load current, said output being coupled to said feedback input of said pulse width modulator.

14. A power supply as defined in claim 1 in which said resistive load is an incandescent lamp.

15. A method as defined in claim 8 in which said resistive load is an incandescent lamp.

* * * * *